Patented Sept. 7, 1937

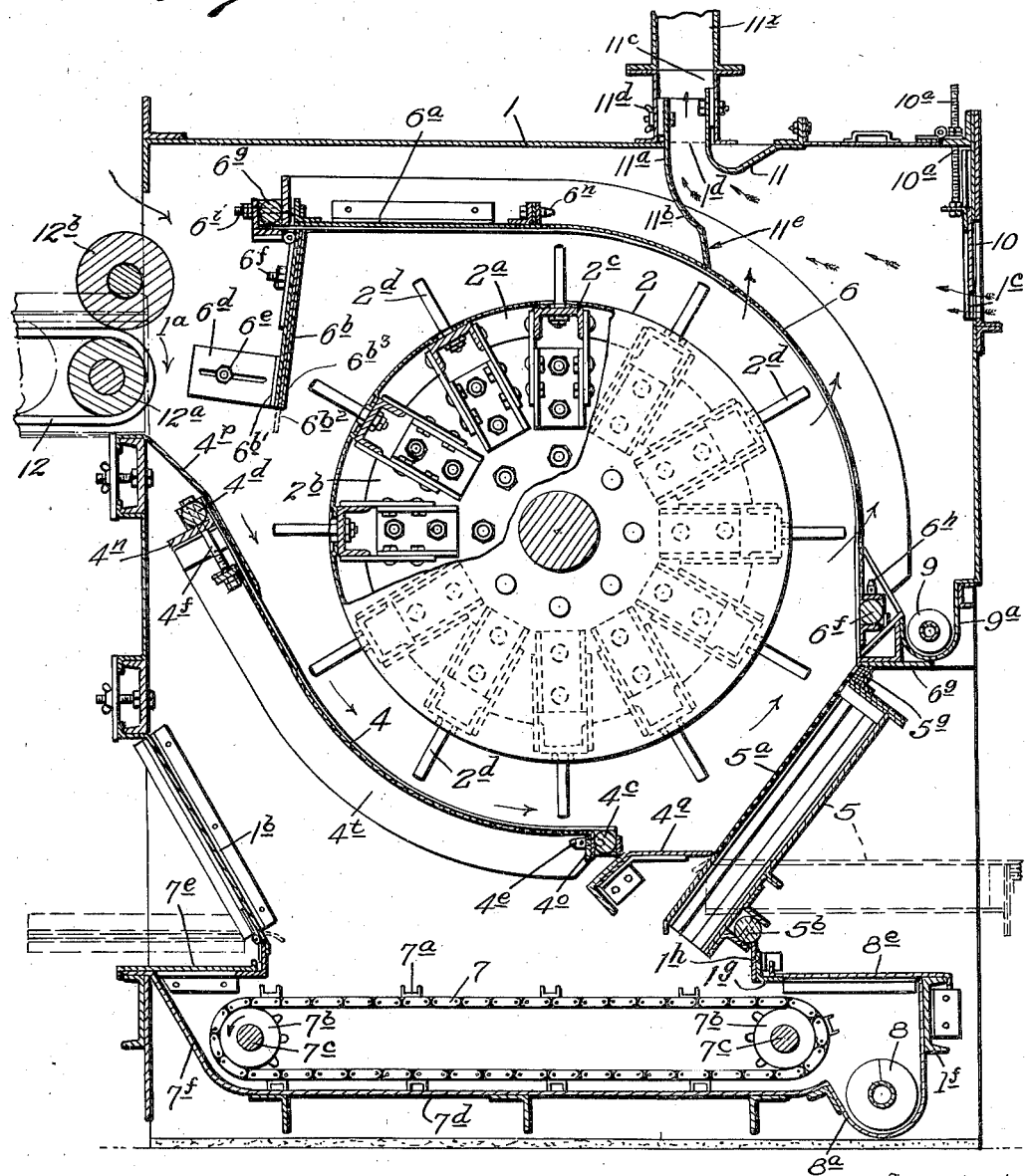

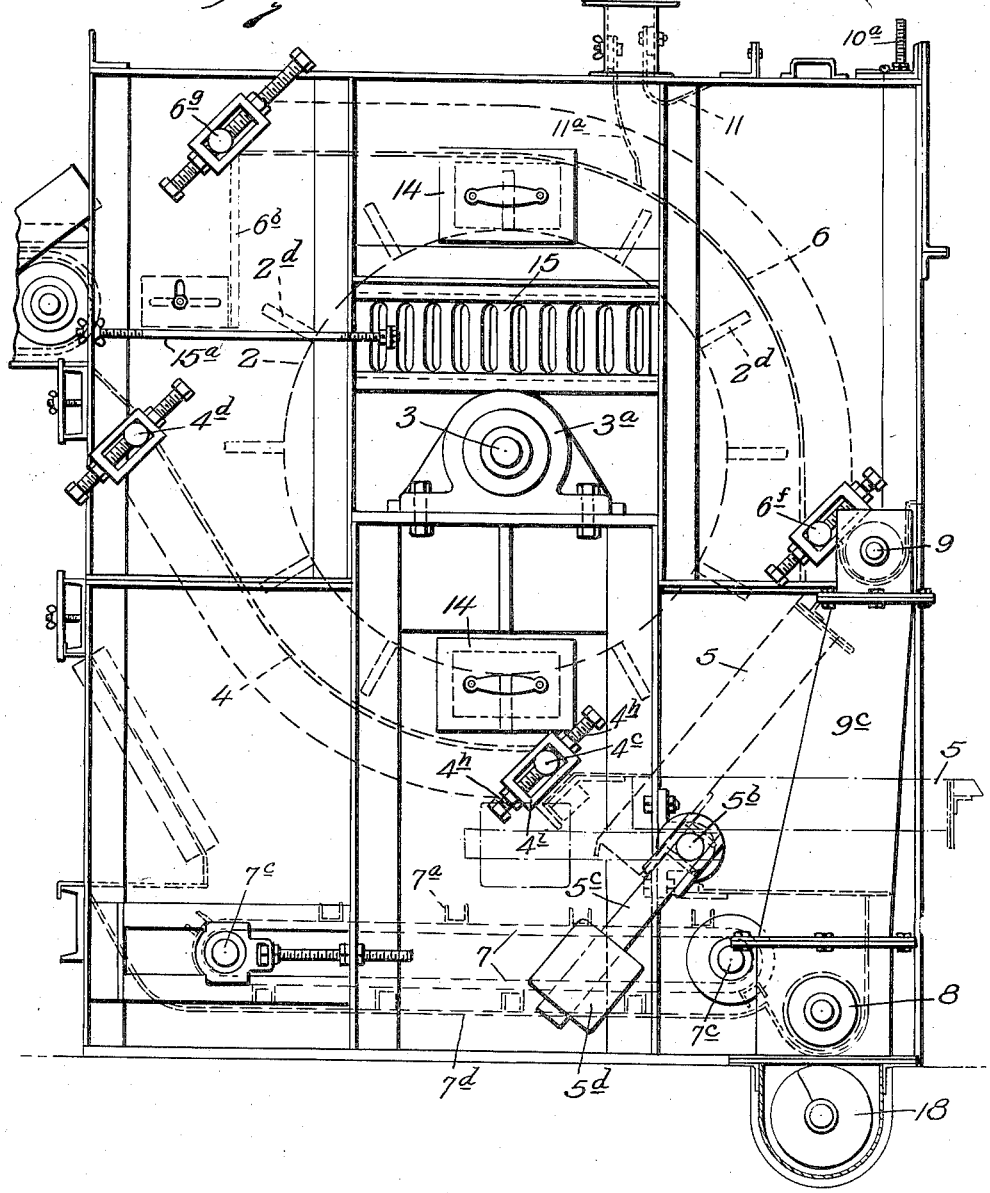

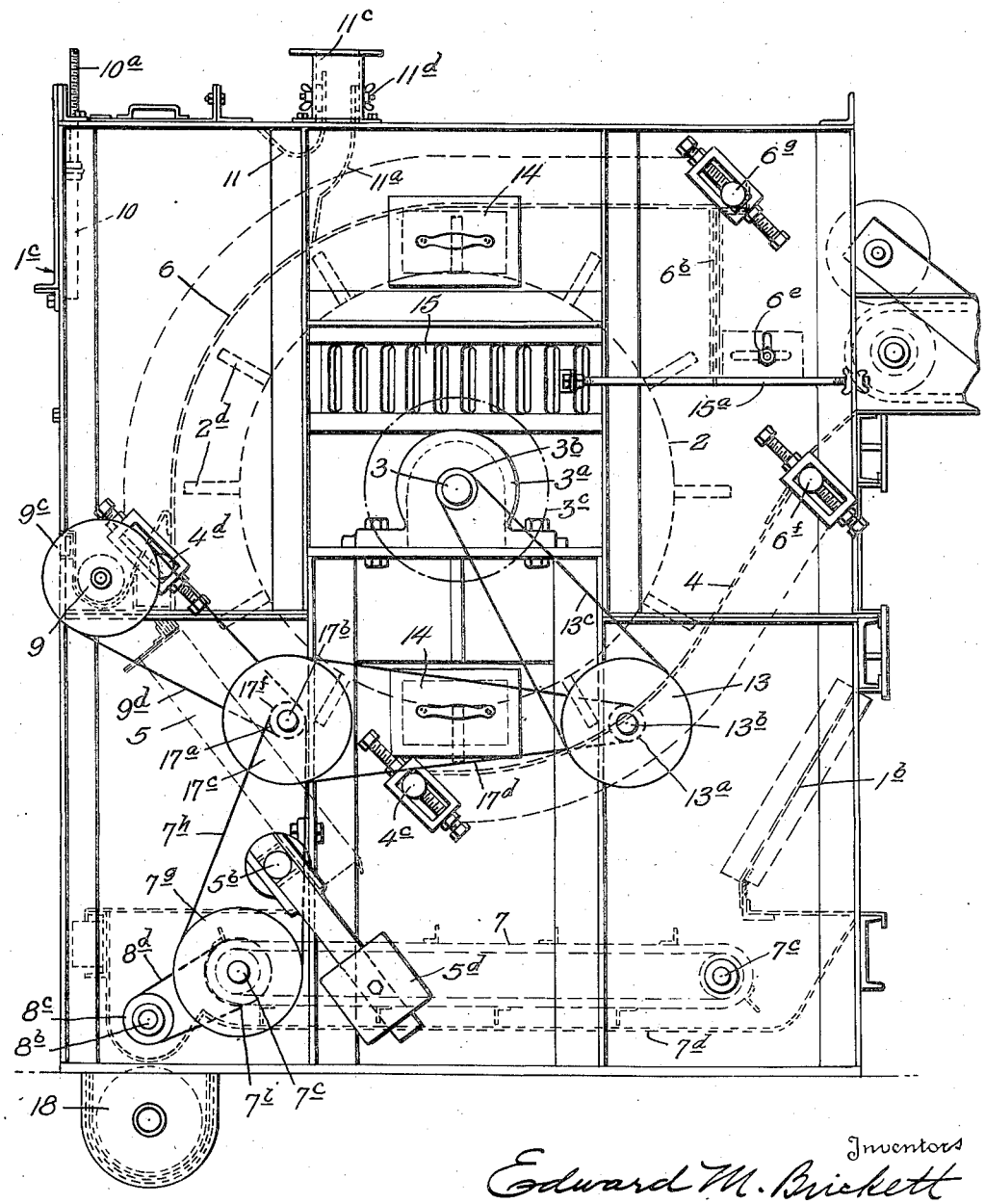

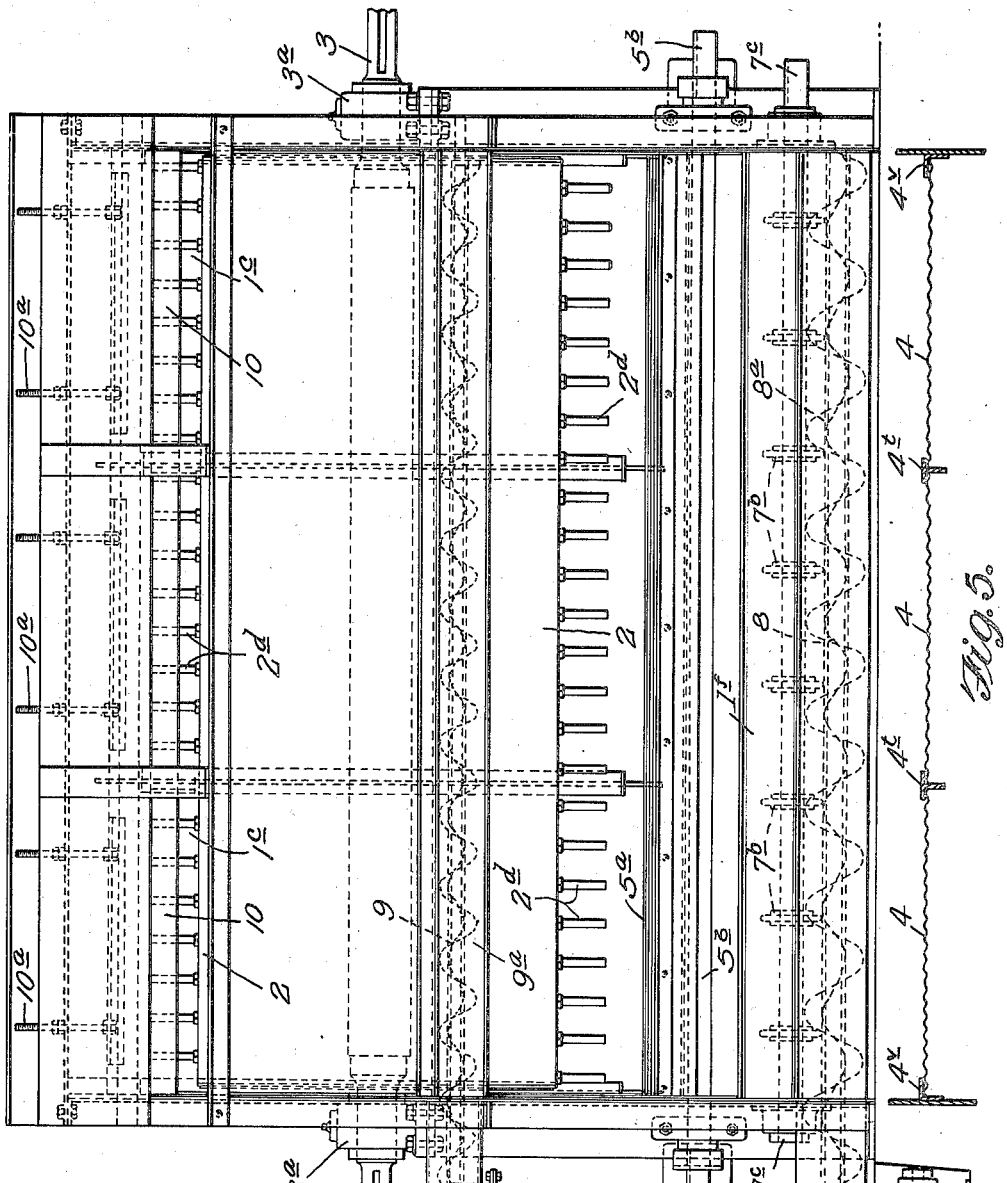

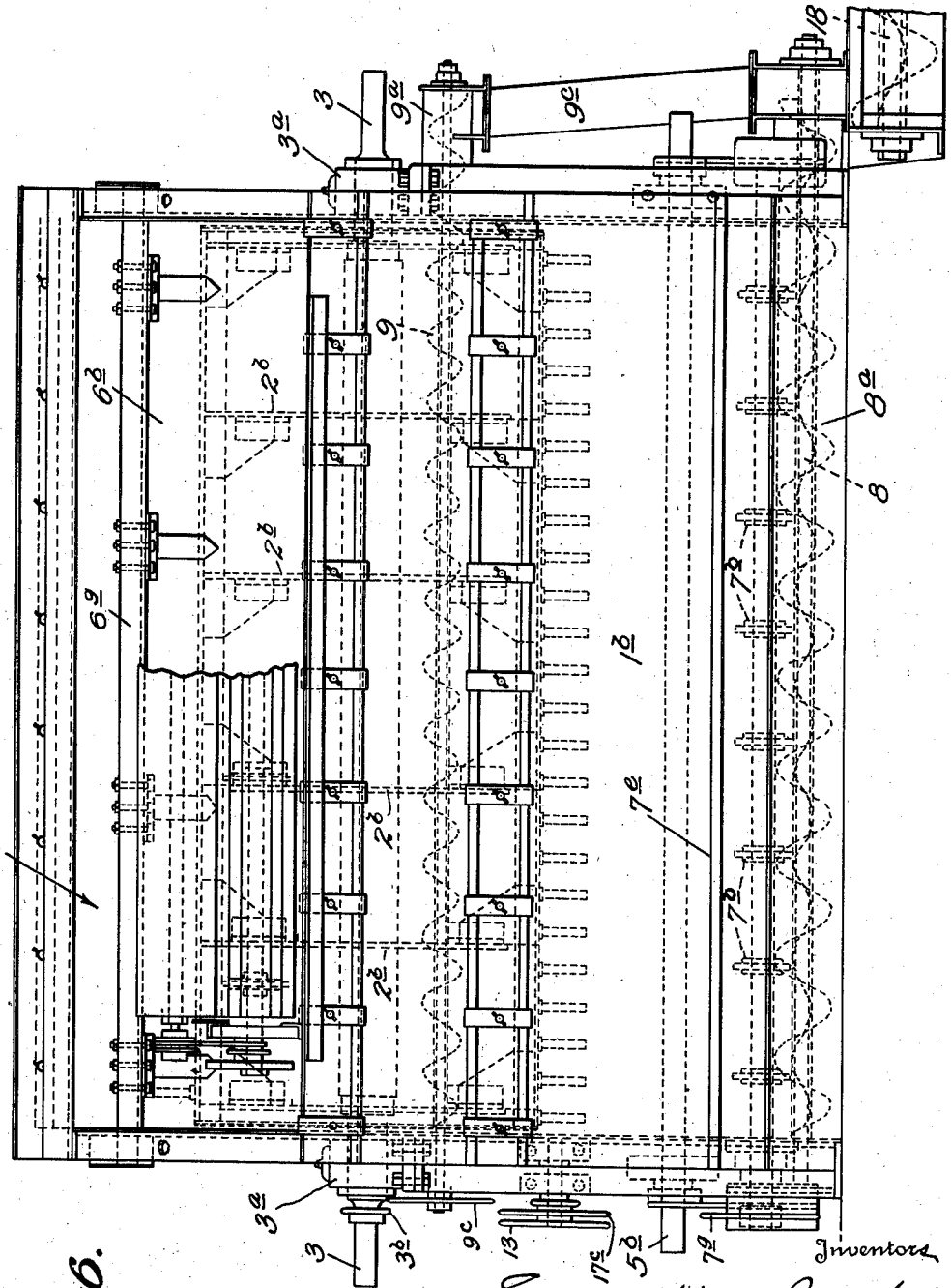

2,092,693

UNITED STATES PATENT OFFICE 2,092,693

DUSTING MACHINE

Edward M. Brickett, North Chelmsford, Mass., and Spencer A. Coleman, Pelham, N. H., assignors to California Process Company, Los Angeles, Calif., a corporation of Nevada Application August 23, 1935, Serial No. 37,558

17 Claims. (Cl. 19—85)

This invention is a novel machine for separating and cleaning materials, such as wool, and other fibrous materials, and is an improvement on the machines shown in Brown et al. application Serial No. 713,062, filed February 26, 1934.

One object of the invention is to provide a screen chamber having means for adjusting the screen sections, whereby the distance between the pins on the rotary beater and the screen sections can be varied as required by the nature of the material being treated.

Another object is to provide novel means for removing impurities which may pass through the upper screen sections, and for controlling the air currents in the duster exterior to said upper screen sections.

Another object is to provide novel means for removing the impurities which may pass through the lower screen sections.

Other minor features of the invention will be hereinafter pointed out.

The accompanying drawings illustrate a machine embodying the invention; and we will first explain the same in detail with reference to said drawings; and thereafter summarize in the claims the various novel features of construction and novel combination of parts for which protection is desired.

In said drawings:

Fig. 1 is a vertical section through the complete machine. Fig. 2 is a right hand end elevation of said machine. Fig. 3 is a left hand, or drive, end elevation thereof. Fig. 4 is a rear elevation of said machine, partly broken away. Fig. 5 is a diagrammatic section through the lower screen sections and frame. Fig. 6 is a front elevation of said machine, partly broken away.

The machine casing 1 is preferably made of metal and has top, front, rear, and end walls; and a bottom suitably connected together.

Rotatably mounted in said casing is a rotary beater comprising a cylindric shell 2, having end plates 2a mounted upon a horizontal shaft 3 journaled in suitable bearings 3a on the end walls of the casing. Within cylinder 2 are spaced spiders or disks 2b fixed on shaft 3 and carrying a plurality of channel members 2c adjacent to and supporting the shell 2. Projecting radially from the periphery of shell 2 are pins 2d, which are preferably mounted on the channel members 2c.

Within the casing below the beater are arcuate screen sections 4 extending from a point adjacent the feed inlet opening 1a in the upper portion of the front wall of the casing and curving downwardly under the beater and extending to a point adjacent the discharge opening in the rear wall of the beater; said screen sections being spaced from the periphery of cylinder 2 sufficiently to clear the pins 2d.

Above the beater are arcuate screen sections 6 extending upwardly from a point adjacent the discharge opening, and partly over the top of the beater toward the feed inlet. The upper end of screen sections 6 are connected to a plate 6a that extends tangentially of the beater and toward the feed opening. The annular space between the periphery of the cylinder 2 and the screens 4 and 6 forms a screening chamber in which the material being treated is confined during the beating operation.

The mounting of the screens

The screens 4 and 6 are preferably attached to frames which in turn are so mounted that they may be moved toward, or away from, the beater, thus governing the clearance between the ends of the pins 2d and the screens. As shown in the diagram (Fig. 5) the sections of screen 4 are carried on metal frames made up of T-shapes 4t and L-shapes 4v. These shapes at their ends are secured to through members 4n and 4o (Fig. 1). The lower screen frame is carried on rods 4c, 4d. The upper screen frame is composed of similar T-shapes and L-shapes and is carried by rods 6f, 6g. There are preferably three screen sections attached to the bottom frame, and three to the top frame as indicated.

As shown the lower ends of the lower screen sections 4 are preferably slipped over studs 4e on rods 4c, retained by cotters, and their upper ends are attached to bolts 4f which are adjustably attached to rod 4d, and by tightening bolts 4f the screens 4 can be drawn taut. The upper screens 6 are preferably engaged with studs 6h on rods 6f and 6n on plate 6a and retained by cotters inserted through the studs. The plate 6a is adjustable horizontally, and screen 6 can be drawn taut by bolts 6i engaging rods 6g, in a manner similar to that used on the lower screens. As it is desirable to use different types of screens for different types of material, or for the procurement of different results in the treatment of a given material, or in case of injury to a screen, the detachable feature of the screens is of great advantage in the replacement of a screen section.

Adjustment of clearance

The amount of clearance between the screens and the ends of the rotor pins has a pronounced effect upon the treatment of the material in the duster, and it is desirable to provide means for varying this clearance in order to obtain optimum results in the treatment of various kinds or conditions of material.

For this purpose the rods 4c and 6f extend through slots in the end walls of the casing and are adjustable laterally in the slots by means of set screws. As shown in Figs. 2 and 3 the rods 4c can be adjusted by means of set screws 4h tapped through brackets 4i on the casing; and the rods 4d, 6f and 6g may be similarly held and adjusted. In Fig. 1 the frames and screens are shown at the position of minimum clearance.

The space between the upper end of screen 4 and the wall of the casing below the feed opening may be closed by a plate 4p, and the space between the lower end of screen 4 and the discharge outlet may be closed by a plate 4q, as shown in Fig. 1.

Throw-out pocket

In order to prevent knotting or rolling of fibrous material we provide a "throw-out" pocket in the screening chamber. As shown in Fig. 1, below the forward end of plate 6a, is a downwardly extending impact plate 6b, which is preferably hinged at its upper end and is adjustable. The impact plate 6b extends downward, approximately vertically toward the upper end of screen 4 and adjacent the feed opening 1a in the casing, the infed material passing into the screening chamber between the lower end of plate 6b and the upper end of screen 4. The angular space formed between the impact plate 6b and plate 6a forms a "throw-out" pocket and as the beater rotates, the fibrous material is thrown by the pins 2d into the pocket and against impact plate 6b, and the shock loosens dirt and foreign matter in the material, and results in a threshing and opening up of the material. The plate 6b momentarily stops the material thrown thereagainst, such material subsequently falling back into the path of the pins 2d in a free and unconfined state; the pins striking the stock returned into their path with high velocity, thereby insuring thorough loosening of the dirt and extraneous foreign matters, as more fully explained in the aforesaid Brown et al. application.

The impact plate 6b may be adjusted to an angularity of approximately 90° with respect to a plane tangent to the upper periphery of the cylinder 2 which will give maximum cleaning without rolling or knotting the stock. Plate 6b may be adjusted by means of slotted brackets 6d fastened to the plate, and engaging bolts 6e attached to the end walls of the casing. The impact plate 6b is in reality composed of three plates 6b1, 6b2, and 6b3. The middle plate, 6b2 may be moved up or down, as indicated by dotted lines on Figure 1, and is clamped in position by the bolts 6f. By the movement of the plate 6b2 the effective length of the impact plate 6b is adjustable and in operation is so adjusted that material in the duster is passed across the gap from the impact plate 6b to the lower screen plate 4p and the lower screen 4 with no loss of material out through the feed inlet 1a.

Discharge door

The outlet or discharge opening is located between the rear lower ends of screens 4 and 6, and is closable by a door 5, attached at its lower end to a rock shaft 5b (Fig. 1). When this door is closed (as shown in full lines in Fig. 1) the material will be retained in the screening chamber. When the door is opened (as shown in dotted lines in Fig. 1) the batch of material will be discharged.

The door 5 has attached to its inner side a screen section 5a which when the door is closed increases the screening area. The outer wall of the door will direct screenings passing through screen 5a to an underlying discharge conveyor 7 hereinafter described. Door 5 may be normally closed and held closed by any suitable means. As shown in Fig. 2 a lever 5c is attached to one end of shaft 5b outside the casing and carries a weight 5d which holds the door normally closed. The door is preferably automatically operated as hereinafter explained. On the upper end of the door is a gasket 5g adapted to make close contact with a plate 6g below the rod 6f when the door is closed.

Screening discharge

The screenings which pass through screens 4 and 5a may be removed by any suitable means. Preferably we provide an endless conveyor 7 to move the screenings to a screw conveyor 8 which discharges the screenings from the machine.

As shown the scraper conveyor 7 is arranged in the casing below the screens 4 and 5a. This conveyor comprises parallel chains which run over sprockets 7b mounted on shafts 7c journaled in the sides of the casing, and to these chains are attached scraper bars 7a. Preferably the sprockets 7b have their peripheries beveled between the teeth so that the screenings will not pack thereon and clog the sprockets. The shafts 7c may be driven by any suitable means so as to cause the lower run of the conveyor to move toward the rear of the casing, and the scrapers 7a will move the material deposited on the bottom plate 7d into the trough 8a of a screw conveyor 8 extending longitudinally of the machine and which will discharge the screenings out of the casing. The trough 8a of conveyor 8 may be closed at its lower and outer sides, and its upper side may be closed by a plate 8e attached to angle iron 1g and channel 1f, an adjustable plate 1h on the angle iron 1g making a close fit against the shaft 5b of the door so as to prevent dust and dirt leaving the duster at this point. Preferably conveyor 8 discharges into a secondary conveyor 18 (Figs. 4 and 6) of any suitable kind that removes the screenings to a desired point of deposit.

Beneath the upper end of the screen 4 and above the forward end of the conveyor 7 is an opening in the casing, which opening is normally closed by a plate 1b which acts as a chute to direct screenings falling thereon onto the conveyor 7. Said plate may be removed when desired to obtain access to the interior of the casing. The end of the conveyor 7 extending beneath the chute 1b may be covered by a plate 7e so as to prevent air entering the casing. The bottom plate 7d is upturned as at 7f to meet the plate 7e and to prevent entry of air beneath the chute 1b.

The heavier screenings passing through the screen 6 can drop into the trough 9a of screw conveyor 9 by which the screenings are discharged out of the casing; and preferably into a trunk 9c by which they are conducted into the conveyor 18 (see Fig. 4).

To prevent dust collecting on the upper part of the screen 6 and to remove light screenings passing through the screen 6, we provide means for maintaining an air suction in the upper part of the casing above the screen 6 and conveyor 9. As shown in Fig. 1 air is admitted to this space through an opening 1c in the casing; the size of which opening is regulable by a slidable plate 10 which is adjustable by means of bolts 10a and adjusting nuts. The air is withdrawn from this space through an outlet opening 1d in the top of the casing surrounded by a flanged collar 11c which may be connected by a dust duct 11x to any suitable suction means not shown. At the side of outlet 1d adjacent air inlet 1c is a curved plate 11 which is adapted to cause a slight downward deflection of the air before it passes into outlet 1d. At the opposite side of said outlet is an adjustable baffle plate 11a, which is so shaped that its lower end 11e is substantially vertical adjacent the screen 6, and above this it is curved as at 11b, to cause a smooth upward flow of air into the suction dust duct (not shown) connected to the collar 11c. The baffle 11a may be adjustably held in position by a bolt and wing nuts 11d. When the top screen 6 is moved to change the beater-pin clearance, as above described, the baffle plate 11a may be adjusted accordingly.

The baffle plate 11 obviates air eddies at the air exit opening. A definite air suction should be maintained across the space between opening 1c and outlet 1d, and the baffle plate 11a is purposely shaped as described so that the area of definite suction is somewhat removed from the screen, and is therefore less likely to pull fibres through the screen. With the parts arranged as shown in Fig. 1 there are no horizontal surfaces on which dirt or screenings may lodge; and the gentle suction maintained will carry off all light particles through the screen 6, and the heavy screenings will drop down to the conveyor 9 and be removed thereby.

Some of the air withdrawn at the outlet 1d is drawn in through the air inlet opening 1c, as indicated by the tailed arrows in Fig. 1; and some enters at the feed inlet of the machine and is drawn through the top screen as indicated by the tailless arrows in said figure.

It is desirable to maintain a slight in-draft at the feed opening 1a to prevent any loss of dust or stock at this point; this is accomplished by so adjusting the extent of opening 1c that the portion of air drawn in at the feed opening will be sufficient for the required in-draft. In our duster we prevent the lodging of heavy dirt or screenings on horizontal parts by so locating the dust take-off and so arranging the screen and baffle plate that there is no point where the heavy dirt can collect.

The drive

The beater may be driven at uniform speed by any suitable means. As indicated in Fig. 3 a pulley 3c on shaft 3 may be geared or belted direct to a motor or other source of power not shown. The conveyor 7 may be driven by reduced gearing or belting from the shaft 3. In Fig. 3 a sprocket or gear 7g on the shaft 7c is driven by a belt or chain 7h from a pinion 17a on a stub shaft 17b. Said pinion 17a is attached to the shaft 17b as is the sprocket 17c which is driven by a belt or chain 17d from a pinion or sprocket 13a on a stub shaft 13b. Said pinion 13a is attached to the shaft 13b as is sprocket 13 which is driven by a belt or chain 13c from a pinion or sprocket 3b on the adjacent end of the beater shaft 3. This arrangement gives the desired reduction of speed between the beater shaft and the conveyor 7. The conveyor 8 may be operated by means of a pinion or sprocket 8c on its shaft 8b driven by a chain 8d from a pinion or sprocket wheel 7i on the stub shaft 7c. The conveyor 9 may be operated by means of a pinion or sprocket 9c on its shaft 9b driven by a belt or chain 9d from a smaller pinion or sprocket 17f on stub shaft 17b. The gears or drives are so proportioned as to give the desired reduction in speed between the beater shaft and the conveyors 7, 8 and 9.

The feed

The material to be operated upon may be fed into the machine through the feed opening 1a by any suitable means. We preferably employ an endless conveyor 12 (Fig. 1) running over pulleys 12a which may be driven by any suitable means (not shown) and which is preferably operated intermittently as hereinafter explained. We also preferably use a gravital roller 12b above the inner roller 12a and cooperating therewith to retain material lying on the lip of the conveyor 12 and prevent this material from dropping into the duster after the conveyor 12 has stopped.

In the ends of the machine (Figs. 2 and 3) may be provided openings for clean out and inspection purposes, which openings are closed by doors 14. We also provide register-like openings in the end walls of the casing which are adjustable and closable by means of slidable valves 15 adjustable by means of threaded rods 15a and wing nuts as indicated. Through these openings a small amount of air can be admitted and pass in toward and around the ends of the beater, thereby preventing the material being operated upon from getting in between the ends of the beater and the end walls of the duster.

In the operation of our machine we preferably provide means for varying the time of the dusting operation or treatment of batches of material in accordance with the quality of the material and the amount of impurities therein. For this purpose we may use means for controlling the stock feed and discharge independently of the means for rotating the beater as shown and described in the application of Brown et al. above referred to, so that the time required for feeding in batches of material and discharging same after it is dusted, can remain constant while the time required for the dusting can be varied according to the quality of the material being treated. This timing means does not form a feature of the present invention and therefore it is unnecessary to illustrate or describe the same herein.

We claim:—

1. In a machine of the character specified; a rotary beater, a plurality of screen sections disposed around and enclosing the beater, means for independently adjusting the screen sections radially of the beater to vary the clearance between the beater and screen sections, an air chamber exterior to the upper screen, an air inlet to said air chamber exterior to said screen, an air outlet from said chamber exterior to said screen, and a baffle in said air chamber adjacent the air outlet, a feed opening between the upper and lower screen sections at one side of the beater, a discharge opening between the upper and lower screen sections at the opposite side of the beater, and a door for closing said discharge opening.

2. In a machine of the character specified; a rotary beater, upper and lower screen sections disposed around the beater, a feed opening between upper and lower screen sections at one side of the beater, a discharge opening between upper and lower screen sections at the opposite side of the beater, a door for closing said discharge opening, an endless conveyor below the lower screen sections for removing the screenings dropped through the lower screen sections, a conveyor adjacent the lower end of the upper screen sections to remove screenings passed through the upper screen sections; and a suction chamber above the upper screen sections having an air inlet and an air outlet exterior to the screen sections.

3. In a machine as set forth in claim 2, an adjustable baffle plate arranged in the said suction chamber between the screen and the air outlet, and a curved plate in said suction chamber adjacent the side of the outlet opposite the baffle plate.

4. In a machine of the character specified; a rotary beater, upper and lower screen sections disposed around and at opposite sides of the beater, a feed opening between the upper and lower screen sections at one side of the beater, a discharge opening between upper and lower screen sections at the opposite side of the beater, a chamber receiving the screenings from the lower screen section, a screen door for closing said discharge opening, a plate on said door behind the screen directing screenings into the chamber, and an endless conveyor in the chamber for removing the screenings dropped through the lower screen sections and screen door.

5. In a machine of the character specified; a rotary beater, upper and lower screen sections disposed around the beater, means for adjusting the screen sections radially of the beater to vary the clearance between the beater and screen sections, a feed opening between upper and lower screen sections at one side of the beater, a discharge opening between upper and lower screen sections at the opposite side of the beater, a door for closing said discharge opening, a screen attached to the door; a suction chamber above the upper screen sections having an air inlet and an air outlet exterior to the said sections, a baffle plate arranged in said chamber adjacent the air outlet, and a conveyor in said chamber adjacent the lower ends of the upper screen sections to remove heavier screenings passing through the upper screen sections.

6. In a machine of the character specified; a rotary beater, upper and lower screen sections disposed around the beater, means for adjusting the screen sections radially of the beater to vary the clearance between the beater and screen sections, a feed opening between upper and lower screen sections at one side of the beater, a discharge opening between upper and lower screen sections at the opposite side of the beater, a door for closing said discharge opening, a screen attached to the inner side of the door, an endless conveyor below the lower screen sections and door for removing screenings dropped through the lower screen section and door screen; a suction chamber above the upper screen section having an air inlet exterior to the screens and an air outlet through which air is withdrawn by suction, a baffle plate arranged in the suction chamber adjacent the air outlet; and a conveyor adjacent the lower end of the upper screen.

7. In apparatus of the character specified; a casing having a feed inlet and discharge outlet, a rotary beater having radially projecting pins, a lower frame arranged between the inlet and outlet, a plurality of flexible and extensible screen sections detachably attached to said frame, an upper frame arranged between the inlet and outlet, and a plurality of flexible and extensible screen sections detachably attached to said upper frame.

8. In apparatus of the character specified; a casing having a feed inlet and discharge outlet, a rotary beater having radially projecting pins, a lower frame arranged between the inlet and discharge, a plurality of flexible and extensible screen sections detachably attached to said frame, an upper frame arranged between the inlet and outlet, a plurality of flexible and extensible screen sections detachably attached to said upper frame, and means for independently adjusting the said frames radially and circumferentially of the beater pins to vary the clearance between the beater pins and screen sections.

9. In apparatus of the character specified; a casing having a feed inlet and discharge outlet, a rotary beater therein having radially projecting pins, a lower frame arranged between the inlet and outlet, a plurality of screen sections detachably attached to said frame, an upper frame arranged between the inlet and outlet, a plurality of screen sections detachably attached to said upper frame, means for adjusting said frames radially of the beater to vary the clearance between the beater and screen sections, an air chamber exterior to the upper screen, an air inlet to said air chamber exterior to said screen, an air outlet from said chamber exterior to said screen, and a baffle in said air chamber adjacent the air outlet.

10. In a machine of the character specified; a casing having a feed inlet and discharge outlet, a rotary beater having radially projecting pins, a lower screen section arranged between the inlet and outlet, an upper screen section between the inlet and outlet, a plate extending tangentially from the upper end of said upper screen section, an impact plate forming with said plate a throw-out pocket, a suction chamber above the upper screen section having an air inlet and an air outlet exterior to the screens, a conveyor in said chamber adjacent the lower end of the upper screen section, and an endless conveyor arranged below the lower screens for discharging the screenings passing through the lower screen sections.

11. Apparatus of the character specified, comprising a casing having a feed inlet and discharge outlet, a rotary beater therein having radially projecting pins, a lower screen section arranged between the inlet and discharge, an upper screen section between the feed and discharge, a plate extending tangentially from the upper end of said upper screen section, an impact plate adjustably connected to said plate and forming therewith a throw-out pocket, a door for closing the outlet, a screen attached to the inner side of the door and lying intermediate the aforesaid screen sections when the door is closed, a suction chamber above the upper screen section having an air inlet and an air outlet, a conveyor in said chamber adjacent the lower end of the upper screen section, and an endless conveyor arranged below the lower screens and door for discharging the screenings passing through the lower screens and door screen.

12. In a machine of the character specified; a beater, upper and lower screens disposed at opposite sides of the beater, an outlet door screen intermediate the aforesaid screens at the rear side of the beater, a feed opening between the aforesaid screens at the front side of the beater; a suction chamber above the upper screen, an air inlet to said chamber exterior to the upper screen section, and an air outlet from said chamber exterior to the upper screen.

13. In a machine as set forth in claim 12, a baffle plate in said suction chamber arranged adjacent the air outlet to prevent eddies in the air leaving the chamber.

14. In a machine as set forth in claim 12, means for independently adjusting the screens radially of the beater to vary the clearance between the beater pins and screen.

15. Apparatus of the character specified, comprising a casing having a feed inlet and discharge outlet, a rotary beater having radially projecting pins, a lower screen arranged between the inlet and outlet; an upper screen arranged between the inlet and outlet, means for adjusting said screens radially of the beater to vary the clearance between the beater and screens, a plate connected to the front end of said upper screen, and an adjustable impact plate connected to said plate, an air chamber exterior to the upper screen, an air inlet to said air chamber exterior to said screen, an air outlet from said chamber exterior to said screen, and a baffle in said air chamber adjacent the air outlet.

16. In a machine of the character specified; a casing having a feed inlet and discharge outlet, a rotary beater having radially projecting pins, a lower screen arranged between the inlet and outlet, an upper screen between the inlet and outlet, a plate extending tangentially from the upper end of said upper screen, an impact plate attached to said plate, an air chamber exterior to the upper screen, an air inlet to said air chamber exterior to said screen, an air outlet from said chamber exterior to said screen, and a baffle in said air chamber adjacent the air outlet, and an endless conveyor below the lower screen for discharging the screenings passing therethrough.

17. In a machine of the character specified; a rotary beater, a plurality of flexible and extensible screens disposed above and below the beater, and means for independently adjusting the screens radially and circumferentially of the beater, to vary the clearance between the beater pins and the screens.

EDWARD M. BRICKETT.
SPENCER A. COLEMAN.